April 5, 1966  E. D. MICHAUD  3,243,944

ROTARY LAWN MOWER CUTTING APPARATUS

Filed Nov. 22, 1963

INVENTOR.
ERNEST DENNIS MICHAUD
BY
William Frederick Werner
ATTORNEY

United States Patent Office 3,243,944
Patented Apr. 5, 1966

3,243,944
ROTARY LAWN MOWER CUTTING APPARATUS
Ernest Dennis Michaud, R.F.D., Saunderstown, R.I.
Filed Nov. 22, 1963, Ser. No. 325,709
2 Claims. (Cl. 56—295)

The present invention relates to rotary blade type lawn mowers and relates more particularly, to a novel and improved blade for use with the foregoing type of lawn mower.

In rotary blade type lawn mowers it is customary to utilize an elongated cutter blade or bar arranged to be rotated by suitable power means in order to cut grass. Heretofore, each cutter bar has normally been manufactured as an integral unit. That is to say, the bar was constituted as a single rigid member, the extreme outer ends of which were sharpened to a cutting edge whereby, as the mower was advanced over a lawn, the blades of grass were engaged thereby and cut. While such lawn mowers have been highly successful commercially it has been found that a unitary cutting bar is not entirely satisfactory therein. For instance, lawns frequently have stones and similar foreign materials lying thereon or embedded therein which are struck by the lawn mower bar as it is revolved while being traversed over the lawn. At the speeds which rotary type lawn mowers are generally operated, contact of the cutter bar with such foreign materials will cause the cutting edge of the bar to become dulled and chipped and may, in fact, cause major portions of the bar to break off.

The present invention has, therefore, as one of its objects to provide a rotary type lawn mower cutter bar incorporating removable cutting blades which are readily replaceable.

Another object of the present invention is to provide a rotary type lawn mower cutter bar incorporating removable cutting blades which are readily adjustable in a horizontal plane.

Yet, a further object of the present invention is to provide a rotary type lawn mower cutter bar incorporating removable cutting blades, which said blades are capable of utilization with generally all existing rotary type lawn mowers.

Still, an additional object of the present invention is to provide cutting blades for incorporation with the cutter bar of a rotary type lawn mower, which said blades are formed to have a channel to receive and expel grass clippings cut by said blades.

Another object of the present invention is to provide a rotary type lawn mower cutter bar having removable blades, which said bar is economical to manufacture, efficient in operation, and durable, versatile, and reliable in use.

Other objects of the present invention will in part be obvious and will in part appear hereinafter.

The invention accordingly comprises the apparatus possessing the construction, combination of elements and arrangement of parts which are exemplified in the following detailed disclosures, and the scope of the application indicated in the claims.

For a fuller understanding of the nature and objects of the present invention reference should be had to the following detailed description taken in connection with the accompanying drawing wherein.

Briefly, the present invention contemplates the provision of an elongated rotary type lawn mower cutter bar, the ends of which are provided with slots or pockets. Each slot accommodates one end of a cutting blade constituted as an insert, the other end of each blade being sharpened along its margin to cut grass. Advantageously, the shank of the inner end of each blade is provided with a plurality of holes thereby permitting adjustment of the blade axially of the cutter bar. Further, the outer end of each blade has an inverted concavity in its lower surface extending inwardly from the outermost edge thereof. This concavity serves as a clearance channel into which grass clippings may be admitted and subsequently expelled outwardly.

Figure 1:
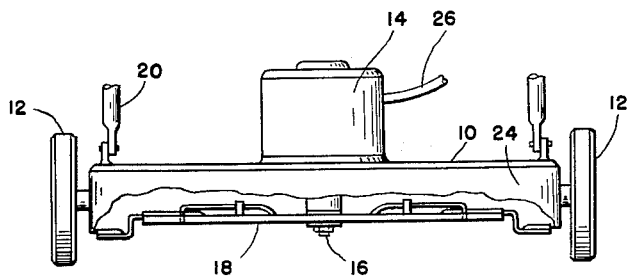
FIG. 1 is a front elevational view of a rotary blade type lawn mower incorporating the improved cutter bar of the instant invention.

Turning now to a detailed description of the invention, reference is firstly made to FIG. 1 wherein is shown a conventional type rotary lawn mower. The reference numeral 10 indicates the mobile frame of the mower. It will be seen that the frame 10 is supported for movement on wheels 12. A motor 14 is mounted on the top of frame 10, this motor having a power shaft 16 depending below the limits of the frame and mounting a horizontally disposed rotary cutter bar 18 at the lowermost end thereof. The mower is guided by handle bars 20 suitably attached to lugs 22 fastened on frame 10, it being understood that, in the complete mower structure, these handle bars would be of sufficient height to be grasped by an operator. A skirt-like guard 24 is attached to frame 10 and extends downwardly to enclose the zone of movement of cutter bar 18 for safety purposes. As illustrated herein motor 14 is of the electric type having a cord 26 running from a source of current to the motor, it being appreciated that a suitable switch, not shown herein, would be provided to control the electrical current to the motor.

The instant invention is illustrated, for convenience, in connection with a conventional lawn mower employing an electric motor as the power source and having but one rotary cutter bar. It is to be understood that the present invention is by no means limited to this specific lawn mower. Rather, the instant invention has equal application to all types of rotary lawn mowers, be they powered by electricity, gasoline, or otherwise. Moreover, applicant's invention is readily usable with a rotary type lawn mower having one or more rotary cutter bars operated parallel to the ground.

Figure 2:
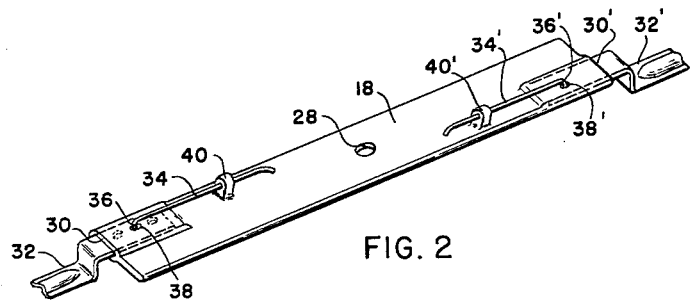
FIG. 2 is an enlarged perspective view of the cutter bar of the present invention.
Figure 3:
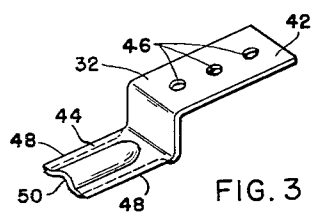
FIG. 3 is an enlarged perspective view of a cutting blade of FIG. 2.

With attention now to FIGS. 2 and 3 it will be seen that the preferred embodiment of the present invention is constituted as an elongated cutter bar 18 previously alluded to in the over-all description of the lawn mower. Bar 18 is pierced through at 28 midway along its length for the reception of shaft 16. The opposing outer ends of bar 18 are provided with slots 30, 30', each of which extends inwardly from the outer end margin of the bar for a sufficient distance to receive and hold blades 32, 32' respectively therein. For the purpose of providing a positive gripping means for each of the blades in its respective slot there is positioned on the top surface of bar 18 a pair of opposed spring members 34, 34', each of these spring members having its inner end, i.e., its end nearest to center of the bar, securely fastened to the blade. The outer end of each member 34, 34' is bent downwardly into a leg 36, 36' respectively. In turn, each of these legs passes through a suitable aperture 38, 38' respectively extending transversely through bar 18 in the zone defined by slots 30, 30'. To the end that each member 34, 34' may be readily manipulated to withdraw it from its companion aperture a pair of bosses 40, 40' are affixed on the surface of bar 18 intermediate the ends of members 34, 34'. Each boss 40, 40' is bored through to receive and hold the elongated run of one of said members 34, 34' upwardly spaced from the surface of bar 18. As will be related more fully hereafter this arrangement contributes to easy replacement of blades 32, 32'.

At this point it will serve to indicate that the blades 32, 32' are alike in construction as well as in their mounting means. Thus, as attention is now directed to the blades it will serve to describe but one of these blades, the description, of course, being equally applicable to the companion blade.

Turning then to FIG. 3 it will be observed that blade 32 is constituted generally as a shank 42 with a conjoined offset cutting section 44. Shank 42 is provided with a plurality of holes 46 pierced therethrough in a line along the medial plane of the shank. The cutting section 44 of blade 32 is sharpened along its opposite edges 48 and, further, is constructed to define an elongated concavity or channel 50 extending along the midline of the cutting section. This channel 50 serves advantageously to receive clippings of grass produced by the rotary sweep of blade 32 and direct the clippings radially away from the lawn mower as cutter bar 18 is rapidly rotated.

As best seen in FIG. 2 blade 32 is secured in its slot 30 by the depending leg 36 of member 34 extending downwardly through aperture 38 and being engaged in one of the holes 46 of the blade. With further reference to FIG. 2 it will be observed that each of the slots 30, 30' are situated adjacent the opposed margins of bar 18 in order that the respective marginal walls of the blade, defined by the slots, may provide a firm support to prevent the blades from pivoting undesirably about legs 36, 36'. Obviously, slots 30, 30' could be situated at other locations on this outer margin as, for example, along the axial midline of the bar, or toward the opposite edge of the bar from that illustrated in the drawing if desired.

In operation with the present invention each of the alignment blades 32, 32' is mounted in its respective slot 30, 30' by first grasping spring members 34, 34' by the convenient grasping area formed between each of the bosses 40, 40' and the outer ends of the bar 18, and raising the companion legs 36, 36' out of apertures 38, 38'. With the legs so elevated each blade may be readily inserted into its slot. The radial location of the blades relative to the rotational axis of shaft 16 is made by guiding the legs 36, 36' through the desired hole 46 in the shank 42 of each blade. Equal distance of the outer end of each blade with respect to the axis of shaft 16 is, of course, desirable in order to maintain dynamic balance of the cutter bar 18 as it is rotated. Once the blades 32, 32' are properly located on the bar 18 the spring members are released to extend legs 36, 36' downward and lock the blades with the bar. At this time the bar is prepared for rotation to cut grass. As bar 18 is rapidly rotated centrifugal force operates to assist in stabilizing the cutting blades in the bar in cooperation with the walls of slots 30, 30' and legs 36, 36' whereby the blades are rigid in alignment with bar 18.

In the event it is desired to change a blade the appropriate spring member 34, 34' can be readily raised to elevate leg 36 or 36' and release the appropriate blade. Obviously, blades 32, 32' are readily interchangeable, one with the other, on bar 18. For this purpose the opposite edges 48 of the blade are sharpened as earlier related. Thus, blades 32, 32' may be utilized at either end of bar 18 irrespective of the direction of rotation of bar 18.

Figure 4:
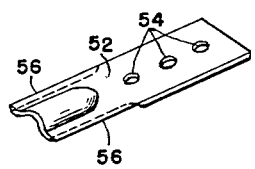
FIGS. 4 and 5 are views similar to FIG. 3 illustrating modified cutting blades.
Figure 5:
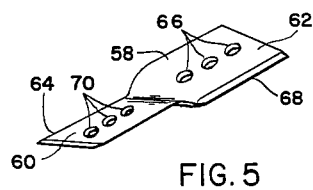

It will be appreciated by those skilled in the art that the blades of the present invention may have a variety of shapes other than that which has already been described and that these blades may be affixed to the cutter bar in numerous other ways. No attempt will be made to describe or illustrate all possible variations along these lines as most of them will be more or less obvious and within the skill of the art. However, for purposes of illustrating the general directions in which these variations may proceed there is illustrated in FIGS. 4 and 5 two modifications of the blade and in FIG. 6 a modification of the means for mounting the blade. Thus, in FIG. 4 the blade 52 is seen to be a straight member having a plurality of apertures therein at 54. The margins of the blade are sharpened at 56 for purposes of cutting grass. With this embodiment the blades would obviously be interchangeable from one end of the cutter bar to the other in order to take advantage of both cutting edges. Moreover, these blades are fully interchangeable for use at either end of bar 18 without regard to the direction of rotation of said bar.

In FIG. 5 there is illustrated a blade 58 having a cutting section 60 and shank 62. It will be observed that this blade has a helix, twist angularly formed section in its body traversing across the general midsection of the blade between its opposite margins, causing the blade to appear spiral-like in end view. This twist serves advantageously to situate the cutting edge 64 of this blade in a plane below the plane of shank 62 and, therefore, below the plane of bar 18, when blade 58 is mounted in the bar in the manner described with the previous blades. It has been found that under certain conditions it is desirable that the cutting edge of the blade be disposed tangential to the plane of movement of bar 18 and, also, that the cutting edge of the blade be below the plane of said bar. Blade 58 uniquely serves these combined purposes.

Blade 58, as with the previous described blades, has a plurality of apertures 66 pierced through the shank 62 to afford adjustment of the blade radially of bar 18 as has already been described in connection with the previous blades. In order to afford interchangeability of these helical blades from one end of bar 18 to the other it has been found advantageous to sharpen the edge 68 of shank 62 on its side opposite from cutting edge 64. Moreover, cutting section 60 of the blade is provided with a plurality of apertures 70 along its axial midline, these apertures serving the same purpose as apertures 66. Thus, it will be readily apparent that blade 58 may be inserted in slot 30 of bar 18 with member 34 holding the blade therein by passing through one of the apertures 66 of shank 62. In this position cutting edge 64 will be below the plane of bar 18 and will sever grass as bar 18 is rotated in a clockwise direction as viewed in FIG. 2. Similarly, shank 62 of blade 58 may be inserted in slot 30' and, with the blade rotated in the clockwise direction as just stated, and with the blade restrained by member 34', said cutting edge 64 will continue to be below the plane of bar 18 for grass cutting purposes.

Should blade edge 64 become dull or should it be otherwise desired to use the opposite cutting edge 68, the position of blade 58 in its respective slot 30 or 30' may be reversed. Thus, cutting section 60 becomes, in effect, the shank of the blade to be introduced into either slot 30 or 30' and the respective member 34 or 34' passing through one of the apertures 70. With blade section 60 so mounted in an appropriate slot 30 or 30', as the case may be, the cutting edge 68 of the blade will be disposed below the plane of bar 18. Thus, as bar 18 is rotated in a clockwise direction, as seen in FIG. 2, edge 68 will cut grass presented thereto.

Figure 6:
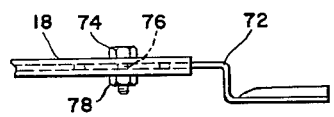
FIG. 6 is a side elevational view of a modified form of connection between the blade proper and the cutting bar.

In FIG. 6 a blade 72 is shown to be affixed to bar 18 by a bolt 74 passing through an aperture 66 of the bar. Here, a nut 78 is employed to secure the bolt in position.

Since certain changes may be made in the above described apparatus without departing from the scope of the invention herein involved, it is intended that all matter

What is claimed is:

1. In a rotary type lawn mower having a rotary shaft, the improvement therein comprising, an elongated cutter bar having two blade receiving end portions, each end portion provided with a slot, said elongated cutter bar having a longitudinal axis, each slot being parallel to said longitudinal axis, means mounting said cutter bar to said rotary shaft, power means for driving said rotary shaft to rotate said cutter bar, two detachable grass cutting blades mounted respectively, on said two blade receiving end portions of said cutter bar and engaging a slot, and holding means residing in a resilient element including a leg portion extending across a slot to hold said grass cutting blade in position on said cutter bar and in a slot to cut grass with the rotation of said cutter bar, said two detachable grass cutting blades being offset to provide grass cutting sections disposed in a plane below the plane of said end portions of said elongated cutter bar, and each of said two grass cutting blades having an elongated channel, parallel to said longitudinal axis when located in a slot, for receiving grass clippings severed by said blade and discharging said clippings radially of the rotative path of said blade.

2. In a rotary type lawn mower having a rotary shaft, the improvement therein comprising an elongated cutter bar having two blade receiving end portions, each end portion having a slot, said elongated cutter bar having a longitudinal axis, each slot being parallel to said longitudinal axis, means mounting said cutter bar to said rotary shaft, power means for driving said rotary shaft to rotate said cutter bar, two detachable grass cutting blades mounted, respectively, on said two blade receiving end portions of said cutter bar and engaging a slot, and holding means residing in a resilient element extending across a slot to hold said grass cutting blade in position on said cutter bar and in a slot to cut grass with the rotation of said cutter bar, said two detachable grass cutting blades each having an angularly formed section extending transversely thereacross to define a shank for reception in a slot and a cutting portion extending outwardly of a slot, said cutting portion being in a plane below the plane of said cutter bar.

References Cited by the Examiner

UNITED STATES PATENTS

| | | | |
|---|---|---|---|
| 1,622,611 | 3/1927 | Sera | 56—295 X |
| 2,477,442 | 7/1949 | Cramer | 56—295 X |
| 2,682,142 | 6/1954 | Clark | 56—295 X |
| 2,795,916 | 6/1957 | Miller | 56—295 X |
| 2,859,582 | 11/1958 | Babcock | 56—295 |
| 3,103,093 | 9/1963 | House | 56—295 |
| 3,152,432 | 10/1964 | Scarnato et al. | 56—295 |

ABRAHAM G. STONE, *Primary Examiner.*

ANTONIO F. GUIDA, *Examiner.*